US011922208B1

(12) United States Patent
Buder et al.

(10) Patent No.: US 11,922,208 B1
(45) Date of Patent: Mar. 5, 2024

(54) HYBRID MODEL FOR TIME SERIES DATA PROCESSING

(71) Applicant: Intuit Inc., Mountain View, CA (US)

(72) Inventors: Immanuel David Buder, Berkeley, CA (US); Shashank Shashikant Rao, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/326,255

(22) Filed: May 31, 2023

(51) Int. Cl.
*G06F 9/48* (2006.01)
(52) U.S. Cl.
CPC ..................... *G06F 9/48* (2013.01)
(58) Field of Classification Search
CPC ......................................... G06F 9/48
See application file for complete search history.

(56) References Cited

U.S. PATENT DOCUMENTS

| | | | | |
|---|---|---|---|---|
| 8,978,034 | B1 * | 3/2015 | Goodson | G06F 16/21 718/101 |
| 11,720,343 | B2 * | 8/2023 | Colas | G06F 8/65 717/168 |
| 2016/0308833 | A1 * | 10/2016 | Yu | H04L 63/0218 |
| 2017/0235785 | A1 * | 8/2017 | Feltham | G06F 16/248 707/690 |
| 2021/0088563 | A1 * | 3/2021 | Yan | G01R 31/086 |
| 2021/0256014 | A1 * | 8/2021 | Dos Santos Poça Dágua | G06F 16/2379 |

* cited by examiner

*Primary Examiner* — Jacob Petranek
(74) *Attorney, Agent, or Firm* — Paradice & Li LLP

(57) ABSTRACT

Systems and methods are disclosed for switching between batch processing and real-time processing of time series data, with a system being configured to switch between a batch processing module and a real-time processing module to process time series data. The system includes an orchestration service to indicate when to switch, which may be based on a switching event identified by the orchestration service. In some implementations, the orchestration service identifies a switching event in incoming time series data to be processed. When a batch processing module is to be used to batch process time series data, the real-time processing module may be disabled, with the real-time processing module being enabled when it is used to process the time series data. In some implementations, the real-time processing module includes the same processing models as the batch processing module such that the two modules' outputs have a similar accuracy.

16 Claims, 5 Drawing Sheets

HYBRID MODEL FOR TIME SERIES DATA PROCESSING

TECHNICAL FIELD

This disclosure relates generally to means for processing time series data, including a hybrid model architecture to switch between batch processing and real-time processing of time series data.

DESCRIPTION OF RELATED ART

Times series data may include any variety of measurements over time. For example, a number of unique visitors to a website may be measured over time, a number of cars travelling along a specific highway stretch may be measured over time, a chance of precipitation may be measured over time, and so on. Such time series data may be processed by a computing system for various applications. For example, traffic to a website may be processed to identify when additional server resources are required for hosting the website, the number of cars travelling along a road may be processed to identify when the road is to be widened or otherwise when traffic conditions need to be improved, and the chance of precipitation may be processed to provide weather forecasts to users or to provide advisory notifications to users.

Processing time-series data may be performed via batch processing or via real-time processing. Batch processing includes collecting a plurality of time series data points (such as the number of unique visitors to a website per hour over a 24 hour period) and processing the plurality of time series data points at one time (such as processing the 24 data points each night in the previous example). Real-time processing includes processing time series data points as they are received (such as processing each hourly data point of website traffic once it is collected).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

For processing of time series data, instead of sticking to either batch processing or real-time processing of time-series data, a computing system may be configured to switch between batch processing and real-time processing of time series data as desired. In general, a computing system may include an orchestration service to identify when to switch between batch processing and real-time processing of time series data. The orchestration system is configured to identify when to switch between a batch processing model of the computing system and a real-time processing model of the computing system for processing the time series data. In this manner, processing resources of the computing system may be conserved when batch processing is sufficient to process the time series data, with the computing system still able to perform real-time processing when needed.

One innovative aspect of the subject matter described in this disclosure can be implemented as a computer-implemented method for processing time series data. The method includes obtaining a time series data, batch processing a first portion of the time series data by a batch processing module, and generating a first output of an output stream by the batch processing module. The method further includes providing, by an orchestration service, a first indication that processing the time series data is to switch from batch processing to real-time processing. The method also includes real-time processing a second portion of the time series data by a real-time processing module based on the first indication. The method further includes generating a second output of the output stream by the real-time processing module, with the second output being subsequent to the first output. In some implementations, to provide the first indication, the orchestration service is configured to identify a first switching event and generate the first indication based on the switching event.

Another innovative aspect of the subject matter described in this disclosure can be implemented in a computing system for processing time series data. The computing system includes one or more processors and a memory storing instructions that, when executed by the one or more processors, cause the system to perform operations. The operations include obtaining a time series data, batch processing a first portion of the time series data by a batch processing module, and generating a first output of an output stream by the batch processing module. The operations further include providing, by an orchestration service, a first indication that processing the time series data is to switch from batch processing to real-time processing. The operations also include real-time processing a second portion of the time series data by a real-time processing module based on the first indication. The operations further include generating a second output of the output stream by the real-time processing module, with the second output being subsequent to the first output. In some implementations, to provide the first indication, the orchestration service is configured to identify a first switching event and generate the first indication based on the switching event.

In some implementations, the system is further configured to identify a second switching event by the orchestration service and generate a second indication by the orchestration service based on the second switching event, with the second indication indicating that processing the time series data is to switch from real-time processing to batch processing. The system may be further configured to provide, by the orchestration service, the second indication, batch process a third portion of the time series data by the batch processing module based on the second indication (with the third portion being subsequent to the second portion of the time series data), and generate a third output of the output stream by the batch processing module (with the third output being subsequent to the second output). The real-time processing module may be disabled based on the second indication.

In some implementations, a fidelity of the second portion of the time series data processed by the real-time processing module is the same as a fidelity of the first portion of the time series data processed by the batch processing module. Each of one or more real-time processing models of the real-time processing module may be the same models as the one or more batch processing models of the batch processing module (such as the model being run with real-time processing parameters instead of batch processing parameters to differentiate between batch processing and real-time processing).

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
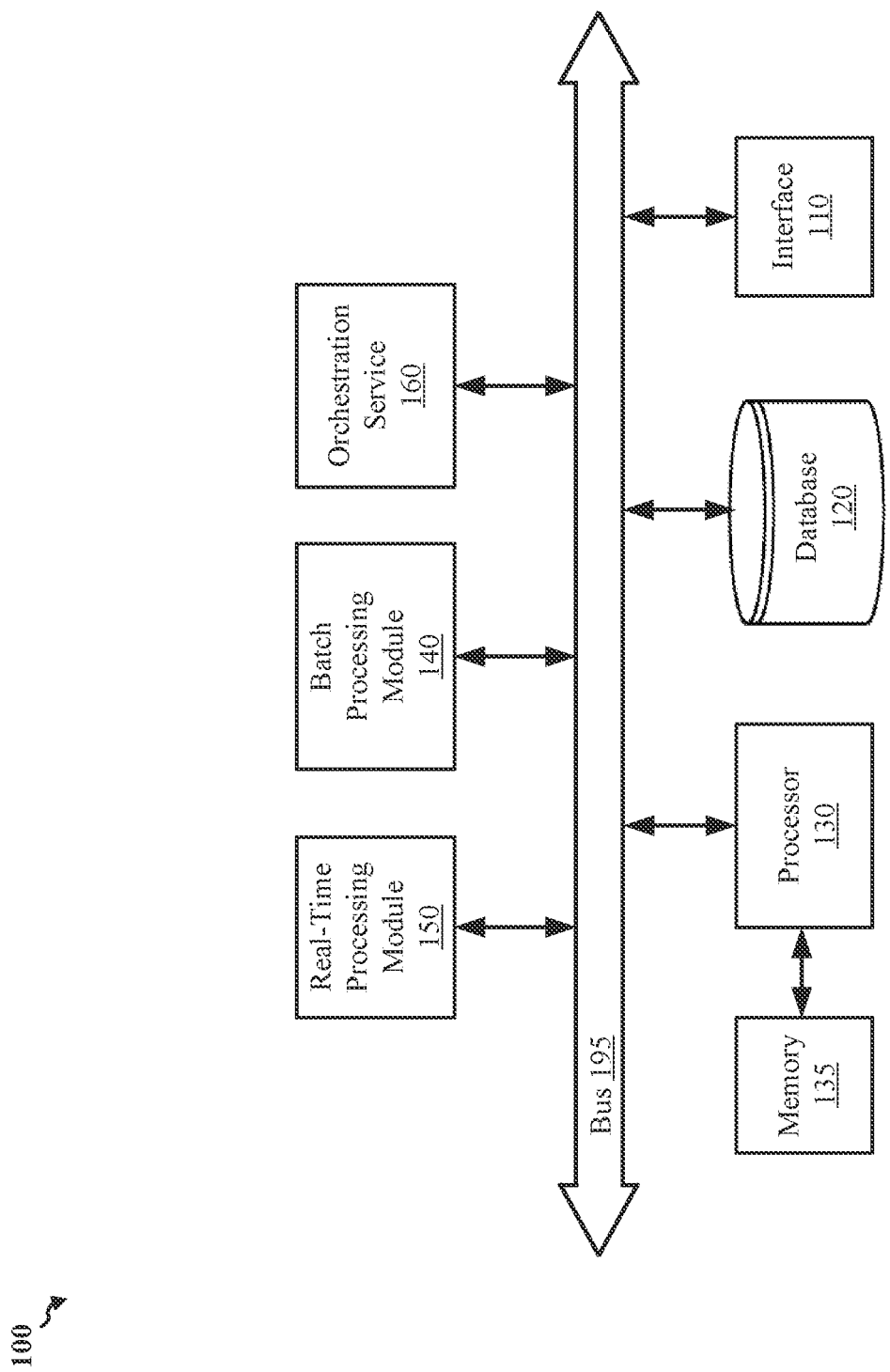
FIG. 1 shows an example computing system for processing time series data, according to some implementations.

Implementations of the subject matter described in this disclosure is regarding processing of time series data. In particular, the subject matter described herein is regarding an orchestration service and a system including such orchestration service to manage switching between batch processing and real-time processing of time series data. As used herein, "time series data" refers to one or more sequences of data points over time measured for any suitable event (such as website traffic, automobile traffic, equity pricing, precipitation, and so on). "Batch processing" refers to processing a plurality of time series data points at approximately the same time (such as collecting hourly data points and processing once at night for 24 data points). "Real-time processing" refers to processing the time series approximately when each time series data point is received (such as processing each hourly data point as soon as it is received). "Real-time" may refer to near real-time, such as operations being performed on data within a threshold amount of time of the data being received. For example, batch processing may be performed hourly or daily, while real-time processing may be performed within seconds (or a fraction of a second) of a data point being received. To note, processing a data point may refer to processing the data point and any previously collected data points based on whatever processing is defined to be performed on the time series data.

Typical time series data processing solutions perform either batch processing or real-time processing. An advantage of batch processing is that fewer processing resources may be required, as processing occurs at longer intervals than real-time processing. For example, processor cycles and memory are not needed to be reserved for data processing between instances of batch processing. However, a problem with batch processing is that batch processing may cause a delay in identifying events of importance that may occur. For example, if website traffic is to be measured throughout the day and processed once a night, batch processing may prevent identifying that the server hosting the website is saturated if there is a large spike in traffic during the day. In addition, batch processing may be a slower process to complete than real-time processing (thus causing increased latency). As such, batch processing may be too late in identifying the instance that additional server resources are needed to handle the additional traffic. Another problem with batch processing is that batch processing may be at too large intervals as desired right at that moment by a user. For example, a person owning the website may wish for analytics up to that moment regarding traffic to and engagement with the website. Analytics provided from the last batch process may be too stale for the person.

An advantage of real-time processing of time series data is that real-time processing allows for up to the moment analytics to be generated. For example, while batch processing may be every day (or even every hour), real-time processing may be up to the second, with any new time series data points being processed as soon as received. A problem with real-time processing is that system resources may continually be tied to the real-time processing of data. For example, processor cycles and memory may need to be reserved and ready to process data points as soon as received.

As such, there is a need for a system configured to switch between batch processing and real-time processing of time series data as desired. Such a system is able to capture the resource savings and other benefits of batch processing while still being able to capture the benefits of real-time processing when desired. Such a system may also benefit from both processing means having similar accuracies (with accuracy not being sacrificed for speed) and various processing means being disabled when not in use (to save power, memory, or processing resources).

Various implementations of the subject matter disclosed herein provide one or more technical solutions to processing time series data. To process time series data, a computing system implements an orchestration service configured to identify when to switch between a batch processing module to process the time series data and a real-time processing module to process the time series data. Switching from the batch processing module to the real-time processing module may be based on a time series data event for which switching is desired (such as website traffic reaching a number of concurrent visitors threshold), may be based on a processing event (such as the intervals between batch processes being longer than a threshold), or any other desired event to cause switching. Switching back to batch processing may similarly be based on any suitable event (such as website traffic staying below the concurrent visitor threshold over an amount of time, the intervals between batch processes lowering to less than the threshold or processing to have occurred so that processing is up to date, etc.). The orchestration service may be any suitable means to identify when to switch between processing modules, such as a machine learning model trained based on various hyperparameters to identify when to switch.

Various aspects of the present disclosure provide a unique computing solution to a unique computing problem that did not exist prior to electronic processing of time-series data. With processing to occur for electronic time series data that may include millions or even more data points, processing of such time series data cannot be performed practically in the human mind, much less using pen and paper. In addition, the orchestration service itself, such as a machine learning model trained to manage switching, cannot be performed in the human mind, much less using pen and paper. As such, implementations of the subject matter disclosed herein are not an abstract idea such as organizing human activity or a mental process that can be performed in the human mind.

FIG. 1 shows an example computing system 100 for processing time series data, according to some implementations. The computing system 100 includes an interface 110, a database 120, a processor 130, a memory 135 coupled to the processor 130, a batch processing module 140, a real-time processing module 150, and an orchestration service 160. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to obtain time series data for processing. The interface 110 may also be configured to provide analytics or other information generated by the computing system 100 by processing the time series data to another device or to a user. The interface 110 may also receive or provide inputs or outputs for continued operation of the computing system 100. An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from other devices (such as a user's local computing system if system 100 is remote to a user, a system hosting time series data or to be used to collect time series data, a system to implement various actions based on processing of the time series data (such as a host to adjust server resources for a website, and so on). In addition, or if the system 100 is local to a user, the interface 110 may include a display, a speaker, a mouse, a keyboard, or other suitable input or output elements that allow interfacing with the user. For example, a third party service may use an application programming interface (API) of the computing system to provide time series data points when the data points are generated for the system 100 to receive the data points via the interface 110. In another example, an API of the computing system 100 may be used to provide information for various client services via the interface 110. The obtaining of data and the provision of client services may be described with reference to being performed via the interface 110.

The database 120 may store the time series data obtained by the interface 110 and to be provided to one or both of batch processing module 140 and the real-time processing module 150. The database 120 may also store outputs of the processing modules 140 and 150, switching events identified by the orchestration service 160, any other outputs form the components 140-160, and formatted data that may be generated by pre-processing the time series data before being provided to the components 140 and 150. The database 120 may also store computer executable instructions or other data for operation of the computing system 100. In some implementations, the database 120 may include a relational database capable of presenting information as data sets in tabular form and capable of manipulating the data sets using relational operators. For example, the time series data as obtained or as pre-processed may be presented in tabular form. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the batch processing module 140, the real-time processing module 150, or the orchestration service 160. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the batch processing module 140, the real-time processing module 150, and the orchestration service 160 that may be executed by the processor 130. The memory 135 may also store portions or all of the time series data, any model hyperparameters, or any other data for operation of the batch processing module 140, the real-time processing module 150, the orchestration service 160, or any other components of the system 100. In some implementations, hardwired circuitry may be used in place of, or in combination with, software instructions to implement aspects of the disclosure.

The batch processing module 140 batch processes time series data received by the system 100. In some implementations, the batch processing module 140 includes one or more batch processing models to process the time series data. The batch processing module 140 (such as each of the one or more batch processing models) may be configured to batch process data at any suitable interval. For example, the module 140 may include a parameter indicating the interval at which data is to be processed, which may be set to hourly, daily, or any other suitable time period. Alternatively, the batch processing module 140 may be configured to process data when the number of data points to be processed reaches a threshold (such as a buffer reaching a threshold of number of data points being stored for processing). The results of the batch processing module 140 are provided and may be stored in a suitable memory (such as the database 120 or the memory 135).

The real-time processing module 150 processes time series data in real-time (such as as soon as received by the system 100 or pre-processed after being received). To note, "real-time processing" refers to the data being processed in a time close to when it was received or pre-processed (such as being formatted) for processing. As such, processing may occur for each data point received. In some implementations, the real-time processing module 150 includes one or more real-time processing models to process the time series data. The system 100 may be configured to provide real-time processing module 140 (such as each of the one or more real-time processing models) a data point when received (or after pre-processing) to process the data point. The results of the real-time processing module 150 are provided and may be stored in a suitable memory (such as the database 120 or the memory 135).

The orchestration service 160 identifies when to switch between batch processing and real-time processing. For example, the orchestration service 160 identifies a switching event to determine when to switch between use of the batch processing module 140 and use of the real-time processing module 150. The orchestration service 160 may also provide instructions to cause switching between the modules 140 and 150. In some implementations, the real-time processing module 150 may be disabled when not in use (such as when batch processing is to be performed). As used herein, disabling the real-time processing module 150 may include placing at least portions of the real-time processing module 150 into a low power state (which may include powering down those portions), freeing (no longer reserving) processing and memory resources typically reserved for the real-time processing module 150 to process the time series data, or otherwise disabling at least portions of the real-time processing module 150 (such as one or more real-time processing models of the real-time processing module 150) when the batch processing module 140 is to be used for time series data processing.

While the batch processing module 140, the real-time processing module 150, and the orchestration service 160 are depicted as separate components of the computing system 100 in FIG. 1, one or more of the components 140-160 may be divided into more components or may be combined into fewer components. The components 140-160 may be included in software including instructions stored in memory 135 or the database 120, may include application specific hardware (e.g., one or more ASICs), or a combination of the above. If the components 140-160 are implemented in software, the components may be implemented using any suitable computer-readable language. For example, each of the components 140-160 may be programmed in the Python programming language using any suitable libraries. While the components are depicted in FIG. 1 as part of one system 100, in other implementations, components of the system 100 may be distributed across multiple devices or in any suitable architecture. As such, the particular architecture of the system 100 shown in FIG. 1 is but one example of a variety of different architectures within which aspects of the present disclosure may be implemented. While the examples herein are described with reference to system 100, any suitable system may be used to perform the operations described herein. In addition, various other components not depicted in the system 100 in FIG. 1 are described with reference to time series data processing, and such components may be included in the system 100 in FIG. 1 or in another suitable architecture. For example, aspects of the present disclosure may be implemented in a cloud environment, such as using Amazon® Web Services (AWS). An example system for time series data processing is depicted in FIG. 2.

Figure 2:
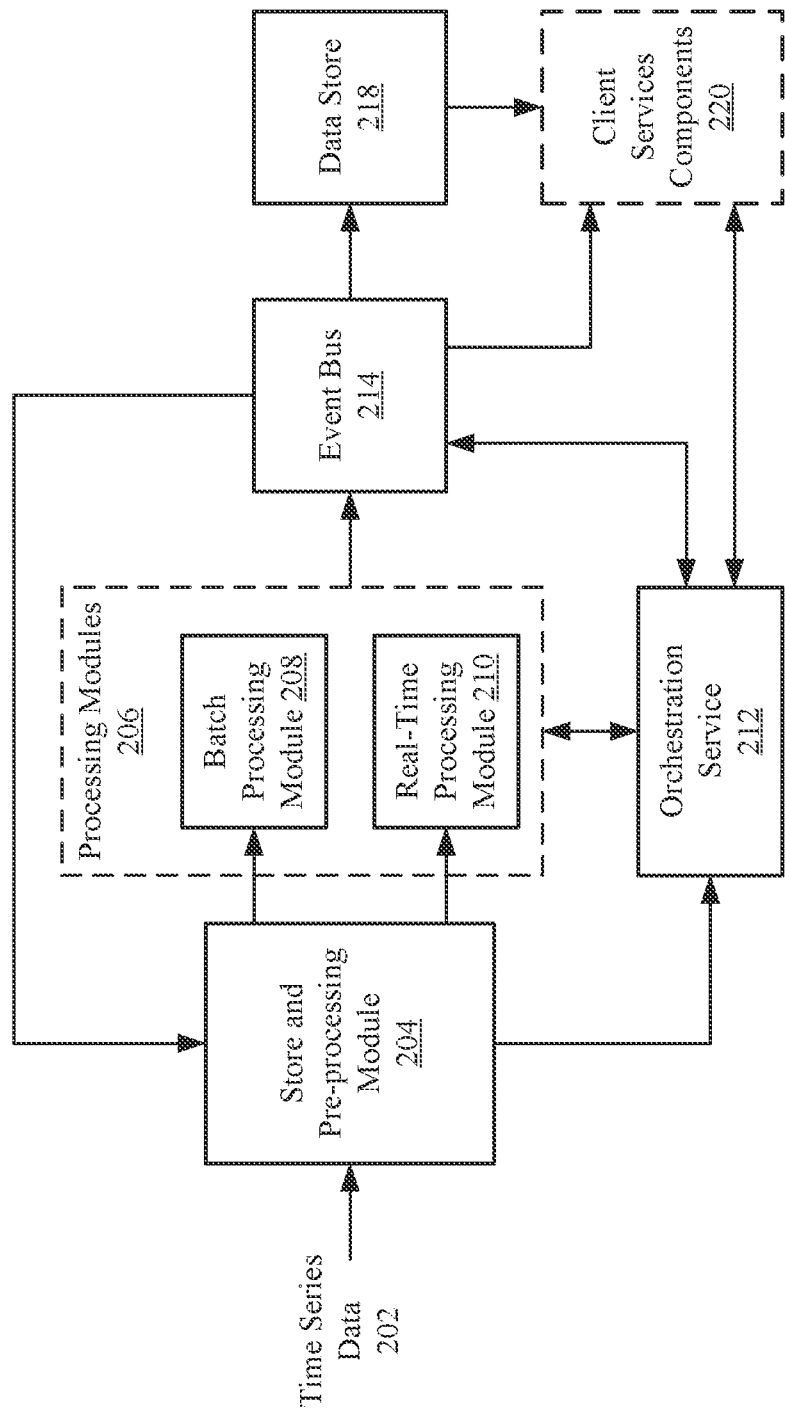
FIG. 2 shows an example system to switch between batch processing and real-time processing of time series data, according to some implementations.

FIG. 2 shows an example system 200 to switch between batch processing and real-time processing of time series data, according to some implementations. The system 200 is an example hybrid model architecture to enable batch processing and real-time processing as desired. While the system 200 may be described as being implemented in system 100, the example system 200 may be implemented in system 100 or in any other suitable architecture (which may be in one device or across multiple devices). For example, the system 200 may be implemented in AWS. The system 200 includes a store and pre-processing module 204, processing modules 206, an orchestration service 212, an event bus 214, and a data store 218. In some implementations, the system 200 may optionally include client services components 220. System 200 may also include other components not depicted in FIG. 2, such as buffers, caches, queues, transform logic, and so on.

The store and pre-processing module 204 is configured to receive and store the time series data 202. The store and pre-processing module 204 may also pre-process the time series data 202 into a format to be processed by the processing modules 206. Referring to FIG. 1, the module 204 may be implemented in the interface 110, the database 120, and other components of the system 100. For example, as noted above, the interface 110 may be configured to obtain the time series data 202 from an external source (such as via an API). In some implementations, the module 204 periodically receives data points of the time series data as they become available. In some implementations, the data points are received and stored, with the data points being provided to the module 204 on an as needed basis. For example, if batch processing is to occur daily, data points for the day may be received and stored, and the data points may then be provided at one time for the day to the module 204. If real-time processing is to be used at the moment, data points may be provided to the module 204 as received. As used herein, "offline" may be used to refer to data or processing that occurs on data that is not to be real-time (such as older data included in a batch for batch processing). "Online" may be used to refer to real-time data or processing of such data that is to occur as the data is received.

In a specific example of data to be processed, the system 200 may be implemented for processing of time series data for the Intuit® QuickBooks® (QBO) platform. QBO is an accounting platform that may be used by small or medium sized businesses or other entities, with QBO automating bookkeeping, invoicing, and other accounting functions associated with the entity. Time series data regarding an entity may include, e.g., cash flow (such as payments sent and received), an account balance, or a liquidity of a business. Obtaining the time series data may include obtaining invoices received or sent or payments received or sent as noted in the QBO platform. For example, an API of the system 200 may couple the QBO platform to the system 200 so that the invoices or payments as noted in a ledger or other record in the QBO platform (which would be the time series data 202) is provided to the system 200. The QBO platform and the system 200 may be coupled such that a data point associated with a new invoice or payment is provided is provided to the system 200 when generated at the QBO platform. In another example, such financial information may be provided by a financial firm's system that may be linked to the system 200. For clarity, system 200 and other aspects of the present disclosure are described with reference to processing time series data from the QBO platform, but any suitable data may be used for the system 200.

Figure 3:
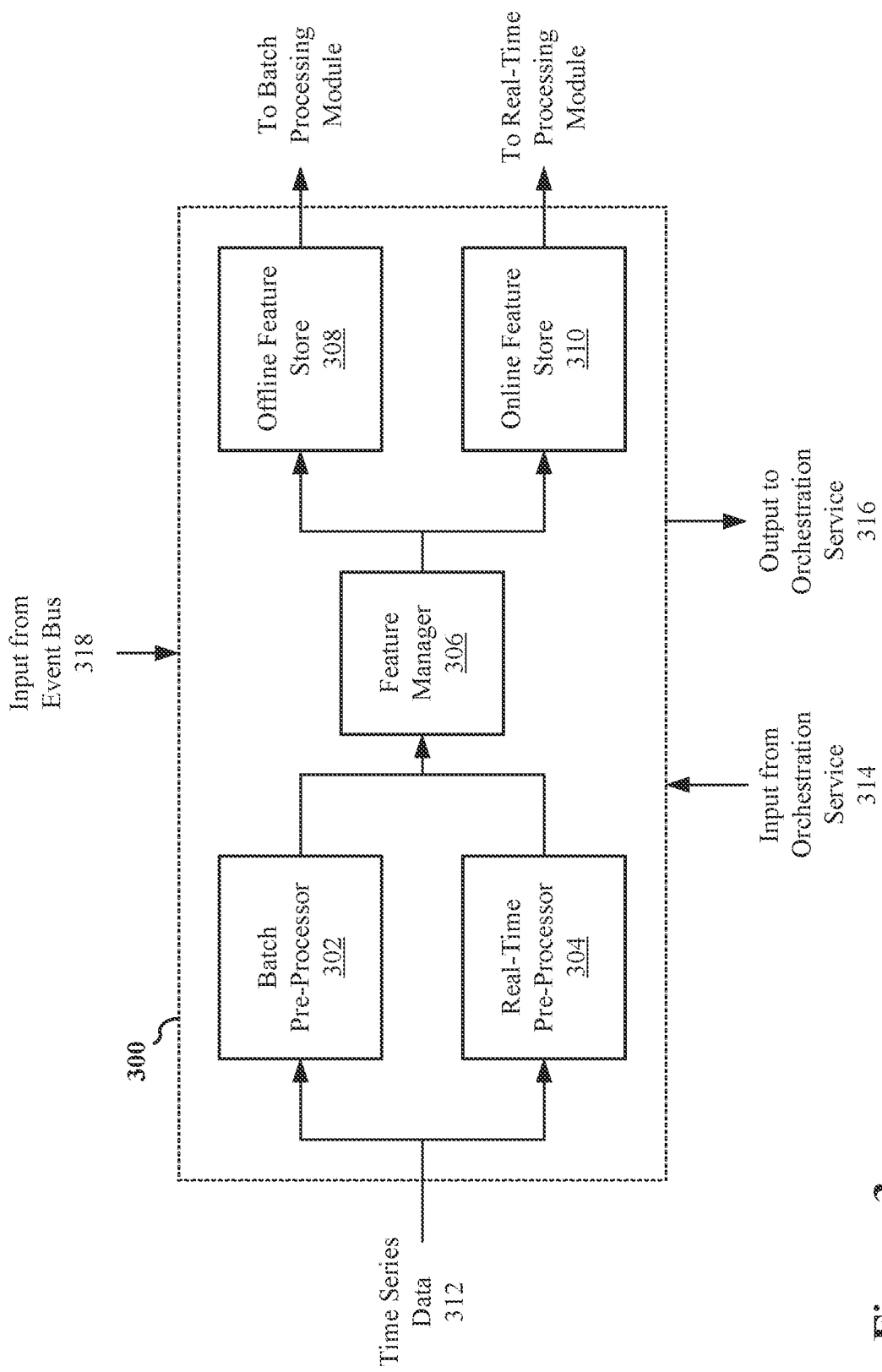
FIG. 3 shows an example feature store and pre-processing module for time series data, according to some implementations.

As noted above, the store and pre-processing module 204 may store (and in some implementations pre-process) the time series data 202 for ingestion by the processing modules 206. FIG. 3 shows an example feature store and pre-processing module 300 for time series data, according to some implementations. The module 300 may be an example implementation of the store and pre-processing module 204 depicted in FIG. 2. The feature store and pre-processing module 300 includes a batch pre-processor 302, a real-time pre-processor 304, a feature manager 306, an offline feature store 308, and an online feature store 310. As used herein, "feature" may refer to a data point or a characteristic of which the data point measures. For example, if climate forecasting is to be performed through processing of time series data, the time series data may include a set of temperature measurements over time, a set of rainfall measurements over time, a set of ultraviolet (UV) index measurements over time, a set of air quality index (AQI) measurements over time, and so on. A feature may be data points of the temperature dataset, the rainfall dataset, the UV index dataset, the AQI dataset, etc. Storing, pre-processing, or processing such features refers to the store, pre-processing, or processing the data points of those features. In the example of the QBO platform, features may include payments made, payments received, account balance, outstanding invoices for which payment is to be received or made, or other suitable characteristics of an entity (which may be a small or medium business (SMB)).

If the module 300 is to pre-process the time series data 312, the module 300 includes the batch pre-processor 302 and the real-time pre-processor 304 to pre-process the time series data 312. The time series data 312 may be a data stream of data points as obtained by the system 200. For example, the time series data 312 may be financial transaction information (such as credit or debit transactions) obtained in a raw format by the QBO platform and provided to the system 200 as obtained. Alternatively, the system 200 may directly obtain the raw format data directly from the financial institution.

Pre-processing may include any suitable operations to place the time series data into a desired format for storage or to be received by the processing modules 206 for processing. For example, financial transaction information may include a vendor name, date, amount, and memorandum (memo) or other notes. Pre-processing may include extracting the vendor name, extracting the memo, extracting the amount, or extracting other desired information from the transactions in the data stream. Extraction may be based on a known format of the transactions or any suitable natural language processing (NLP). Pre-processing may also include combining different extracted data (such as concatenating the vendor name and the memo) into a desired format (such as a defined format for the feature manager 306 or the feature stores 308 and 310, which may be specific tables in the database 120 (or another suitable memory) to organize the features to be provided to the modules 206). Other example operations that may be performed during pre-processing may include annotation and labelling of the data for a desired format for processing. As depicted, the output of the pre-processors 302 and 304 is the time series data 312 in a format for the feature manager 306.

The batch pre-processor 302 (which may also be referred to as an offline pre-processor) pre-processes time series data in which updates to the time series data 312 is not required in real-time. For example, if batch processing is to be performed hourly, the batch pre-processor may pre-process the batched data for the hour, with a latency of, e.g., 10 minutes in pre-processing the data not of as high importance as for real-time processing (for which time is of the essence). Conversely, the real-time pre-processor 304 (which may also be referred to as an online pre-processor) pre-processes time series data in which updates to the time series data 312 is required in real-time. As such, reducing latency from the real-time pre-processor 304 is more desired than from the batch pre-processor. In some implementations, the real-time pre-processor may include additional or faster processor and memory resources to pre-process the time series data 312 in real-time. Conceptually, the batch pre-processor 302 and the real-time pre-processor 304 may be transforms applied to the time series data 312 to generate the features to be used for processing.

In some implementations, the system may disable the real-time pre-processor 304 (such as freeing the processor and memory resources reserved for such pre-processing) while the system is not to perform real-time processing of the time series data. For example, an input 314 from the orchestration service may include indications as to when to switch between batch processing and real-time processing. The real-time pre-processor 304 may receive the indications and disable or enable based on whether real-time processing is to being or end. To note, while separate pre-processors 302 and 304 for offline and online are depicted in FIG. 3, in some implementations, the components 302 and 304 may be a single pre-processor to pre-process the time series data 312. As such, disabling the teal-time pre-processor 304 may include reducing or otherwise adjusting the processor or memory resources reserved for pre-processing such that pre-processing of the time series data 312 may take longer to complete.

In some implementations, the real-time pre-processor 304 may keep at least a portion enabled to pre-process at least a portion of the time series data 312 while batch processing is to be performed. For example, a defined interval of data points may be pre-processed, with the pre-processed data points to be used by the orchestration service to determine whether the switch to real-time processing. In a specific example, the real-time pre-processor may continue to extract transaction amounts to provide to the orchestration service (via the output 316), with the orchestration service to indicate real-time processing is to be performed when receiving an amount greater than a threshold or as otherwise defined. As such, disabling the real-time pre-processor 304 may include disabling all or only a portion of the pre-processor 304 when batch processing is to be performed. Alternatively, the real-time pre-processor 304 may remain enabled so that data may be provided to the orchestration service for review.

In some implementations, the feature manager 306 includes a workflow management platform for managing the data as it passes through the system 200. For example, the feature manager 306 may be configured to train the pre-processors 302 and 304 or the models of the processing modules 206 if the models include machine learning (ML) models. The feature manager 306 may also be configured to select which models are to be applied to the time series data 312 to generate the features or to be applied to the features to generate the outputs of the processing modules 206. An example feature manager 306 may include AWS SageMaker or Google® Cloud Platform (GCP) VertexAI. As such, as new data is received or processed (which may include input 318 from the Event Bus 214 storing the outputs of the processing modules 206), the feature manager 306 may be configured to update models or the workflow of processing the time series data to attempt to improve the system outputs (such as the processing module outputs) or the workflow itself. Alternative to the feature manager 306 being included in the module 300, once the system 200 is configured and finalized, the module 300 may not include the feature manager 306, with the features output by the pre-processor 302 and 304 being provided directly to the stores 308 and 310, respectively.

The offline feature store 308 and the online feature store 310 are feature stores of time series data 312. In some implementations, the feature stores 308 and 310 may also be of non-time series data that is combined with time series features. As such, time series data 312 may refer to specifically time series data or non-time series data that is combined with one or more time series features. The stores 308 and 310 store the features of the time series data 312 as output by the pre-processors 302 and 304 (such as concatenated vendor name and memo of transactions) or as otherwise provided by the feature manager 306 in a manner that is ready to use by the processing modules 206 or the orchestration service 212. As depicted, the offline feature store 308 stores features from the batch pre-processor 302 as provided by the feature manager 306, and the online feature store 310 stores features from the real-time pre-processor 304 as provided by the feature manager 306. In some implementations, since latency is not as large of a concern for batch processing, the offline feature store 310 may be implemented in a manner with higher latency (such as in a cloud storage solution with more delay) but which may have better scalability. For example, if the system 200 (including the module 300) is implemented in AWS, the offline feature store 308 may be implemented in Amazon Simple Storage Service (S3) to handle larger data transfers, and the online feature store 310 may be implemented in Amazon DynamoDB to handle smaller data transfers with lower latency. The offline feature store 308 may also be configured to store historic features for as long as desired (such as months or years of data points that may be of use in the future for processing, training, and so on). For example, Amazon S3 may be configured to store the data points generated by the batch pre-processor 302 from the last two years, with expiration rules set such that data points reaching the two year anniversary are removed from the store. The online feature store 310 may store a much smaller set of historic data points (such as an hour or a day of data points), with the data points available within milliseconds for processing by the real-time processing module 210. In some implementations, the size of features (number of data points) to be stored at the online feature store 310 may be defined based on the batch interval for batch processing. In this manner, older data points may be retrieved from the offline feature store 308 if no longer stored in the online feature store 310. In some implementations, the online feature store 310 may be conceptualized as a buffer or cache (which may include limited functionality to improve latency), while the offline feature store 308 may be conceptualized as a more long term memory (which may be more feature rich). The features in the offline feature store 308 may also be used to train any new ML models or processes (such as those implemented in the workflow via the feature manager 306 or added to the batch processing module 208 or the real-time processing module 210). To note, while the storage means may differ between the offline feature store 308 and the online feature store 310, the fidelity of the data being stored may be the same. For example, the same information for a data point stored at the online feature store 310 is the same information that would be stored at the offline feature store 308, except potentially in a different format or storage object. As such, the system 200 does not require paring of data or otherwise adjusting the data to be processed by the real-time processing module 210 that would affect accuracy of the outputs. In some implementations, the batch processing module 208 and the real-time processing module 210 have similar output accuracies between each other.

Referring back to FIG. 2, the processing modules 206 include the batch processing module 208 and the real-time processing module 210. The batch processing module 208 performs batch processing on the time series data 202, which may include the batch processing module 208 being configured to obtain the offline features from the offline feature store 308 and batch process the offline features. The batch processing module 208 may be an example implementation of the batch processing module 140 of the system 100 depicted in FIG. 1. The real-time processing module 210 performs real-time processing on the time series data 202, which may include the real-time processing module 210 being configured to obtain the online features (or the online features being pushed to the real-time processing module 210) from the online feature store 310 and real-time process the online features. The real-time processing module 210 may be an example implementation of the real-time processing module 150 of the system 100 depicted in FIG. 1.

Referring to the batch processing module 208, the batch processing module 208 includes one or more batch processing models. Each batch processing model may be configured to batch process time series data regarding a specific feature or a specific portion of features. For example, from the QBO platform, time series data 202 may include financial transaction (such as bank transaction) data, invoice data, tax payment data, or other time series data regarding an entity. The module 300 may be configured to generate one or more features from the financial transaction data, one or more features from the invoice data, and one or more features from the tax payment data (such as amount paid over time, amount billed over time, size of payments, etc.). A first of the offline features (with data points stored in the offline feature store 308) may be processed by a first batch processing model (with or without a portion of the other features), a second of the offline features may be processed by a second batch processing model (with or without a portion of the other features), and so on.

Each of the batch processing models may be any suitable model to generate a desired output. For example, if the system 200 is to predict future visitor count for a website, a batch processing model may be any suitable predictive or inference model to predict a number, predict a range of numbers, generate a confidence in a number or range of numbers or otherwise be used to predict a future visitor count. To note, multiple models may exist to predict or infer the same information (such as in a duplicative effort to reinforce a prediction), or each model may be configured to predict different information. In some implementations, in the QBO example, a batch processing model may be associated with a specific entity. In this manner, a plurality of entities would be associated with a plurality of batch processing models. However, the batch processing models may be associated with or otherwise organized in any suitable manner.

Each model may be a statistical model (rule based model) or an ML model. For an ML model, the model may be based on, e.g., one or more of decision trees, random forests, logistic regression, nearest neighbors, classification trees, control flow graphs, support vector machines, naïve Bayes, Bayesian Networks, value sets, hidden Markov models, or neural networks configured to generate prediction or a confidence for prediction. As noted above, the features stored in the offline feature store 308 may be used by the feature manager 306 to train an ML model.

One type of model that may be included in the batch processing module 208 is time series models. Time series models are configured to predict future data points of the time series data. For example, for QBO, a time series model may be configured to process the offline features from the financial transaction data to predict recurring transactions. In the example, the time series model may predict a recurring transaction of, e.g., a monthly rent payment based on the repetition of such payments over a time period. In some implementations, such a time series model may be based on Fourier transforms, with the time series data provided to the processing model being transformed into Fourier signal components and processed to identify a repetitive payment. Such a time series model may predict the existence of the recurring payment, the date that the payment is predicted to be made, and the amount predicted to be paid. Other time series models in the QBO example may include models configured to predict when supplies are to be ordered based on previous supply orders by the entity, seasonality of purchases from the entity, weekly sales of the entity, and so on based on the features stored in the offline feature store 308.

In some implementations, the batch processing module 208 includes a plurality of batch processing models, with only a subset of the batch processing models to be used at certain moments. For example, the orchestration service 212 may indicate which processing models are to be used, with the other models remaining disabled or otherwise unused. The indication of which models to be used may be based on the outputs desired at that moment or other pertinent information. For example, if an outlier prediction is generated by a batch processing model or otherwise by the batch processing module 208, the orchestration service 212 may indicate that the prediction is to be regenerated with any new offline features in the offline feature store 308 to confirm the previous prediction. As such, other predictions from other models may not be needed at that time and thus not generated.

Referring to the real-time processing module 210, the real-time processing module 210 includes one or more real-time processing models. Each real-time processing model may be configured to real-time process time series data regarding a specific feature or a specific portion of features (similar to as described above for batch processing models). In some implementations, each real-time processing model may correspond to a batch processing model of the batch processing module 208. For example, if the batch processing module 208 includes a time series model to predict a future transaction, the real-time processing module 210 may include a time series model to predict a future transaction.

In some implementations, the real-time processing model and the batch processing model may be the same model with the model operating under different parameters based on whether batch processing or real-time processing is to be performed. For example, with latency being less of a concern for batch processing, the model may be enabled to generate a prediction and other information that may be of use (such as for various client services). Conversely, with latency being a concern for real-time processing, the model may be focused to generate only the prediction. For example, for data from QBO, the processing model for batch processing may generate a prediction for a plurality of entities (with the offline feature store 308 storing features for a plurality of entities) while the processing model for real-time processing may generate a prediction for only one specific entity. If the same model is used to perform batch and real-time processing of time series data, the fidelity of the data that is batch processed may be the same as the fidelity of the data that is real-time processed. In other words, paring or otherwise simplifying the data is not required when switching between batch processing and real-time processing. In some implementations, only the location and the format of the data input to the model may change when switching between the offline feature store 308 and the online feature store 310. As such, switching between the batch processing module and the real-time processing module may refer to one or more processing models adjusting the parameters under which they operate. Switching between batch processing and real-time processing may also refer to one or more models being enabled or disabled based on the type of processing. In some implementations, disabling the real-time processing module 210 may refer to some functionality of the model being disabled (such as portions used to generate predictions for other entities).

In the example of adjusting the model to generate a prediction for a single entity during real-time processing (while batch processing would include generating predictions for a plurality of entities), features associated with the single entity would be provided to the processing model while other features would not. In this manner, the model would generate a prediction for only the single entity. For example, the online feature store 310 may be configured to include a plurality of stores, with each store storing features associated with a specific entity. In this manner, if a prediction is to be generated for a specific entity, the features in the specific store for the entity may be provided to the processing model without providing the features in the other stores for other entities. Conversely, for batch processing features in the offline feature store 308 for all of the entities may be provided to the processing model for the model to generate a prediction for each entity. In this manner, real-time processing may lead to the model generating a prediction (such as a weekly sales forecast) for a particular entity in real-time so that information may be updated quickly for the entity. Conversely, batch processing may lead to the model generating a prediction (such as a weekly sales forecast for each of the entities (which may be in a delayed manner) so that context may be provided regarding the particular entity's prediction. For example, regarding a weekly sales forecast, a real-time prediction may alert a client as to whether there is a large drop or increase in sales predicted as soon as possible. Conversely, batch predictions across entities may provide context to the client as to whether a predicted increase or decrease in weekly sales is industry wide or is more acute to the entity itself.

For a real-time processing model and a batch processing model being the same model, the model may be adjusted to improve latency without decreasing accuracy. For example, the system 200 may be configured to reserve more memory or processing resources for the model when real-time processing is to be performed in order to increase the speed at which the model processes data. When batch processing is to be performed, less memory or processing resources may be reserved to preserve such resources. In a specific example with time series data from QBO, the same number of instructions or operations would be performed for an entity for either batch processing or real-time processing. Additional or alternative to only providing features for that entity (and no other entity) for real-time processing to improve latency, the system 200 may increase the memory and processing resources (such as processor cycles or a faster processor core to be used) for real-time processing to execute the same number of instructions or complete the same number of operations in less time than for batch processing in which fewer resources are used.

If the batch processing model and the real-time processing model are the same model and both batch processing and real-time processing is to be performed concurrently, a first instance of the model (with the patch processing parameters) may be used to perform batch processing, and a second instance of the model (with the real-time processing parameters) may be used to perform real-time processing. For example, the model may be defined in an object, file, or otherwise in software. A first instance of the software may be executed with the batch processing parameters and a second instance of the software may be executed with the real-time processing parameters in order to concurrently perform batch processing and real-time processing.

In some alternative implementations to a real-time model and a batch model being a same model but with different operating parameters based on the processing, the real-time processing model may be a separate model of the same type as the batch processing model. For example, the batch processing model may be stored in a first portion of software, and the real-time processing model may be stored in a second portion of software. The models may be trained using the same data and in the same manner.

In any of the example implementations of how the processing model or models exist, accuracy is not sacrificed when switching from batch processing to real-time processing, as the same fidelity data may be processed and the same model or type of model may be used to perform such processing. For example, for the same model, the same data points may be processed by the model for the entity of interest, with the difference between batch processing and real-time processing being that other entities' data points are processed for batch processing (with such being excluded for real-time processing).

The output of the processing modules 206 (such as predictions from one or more processing models) are provided to the event bus 214. The event bus 214 is configured to relay data (such as the predictions) or other information between components of the system 200 (such as between the processing modules 206, the feature manager 306, a data store 218, and/or one or more client service components 220 (if included in or coupled to the system 200). The event bus 214 may be a rule based router between the various components, with the rules defined as to when and which data in the event bus 214 is to be routed which component. In some implementations, the event bus 214 may be implemented in Amazon EventBridge of AWS. While not depicted in FIG. 2, in some implementations, the output of the real-time processing module 210 may also be provided to a cache for storage and access in the near future. In some implementations, the output of the batch processing module 208 may be provided back to the feature manager 306 and stored, e.g., in the offline feature store 308. Additionally or alternatively, the output of the batch processing model 208 may be stored in a data store 218. In some implementations, the data store 218 may be a data lake, such as Data Lake on AWS.

Referring back to the processing models of the processing modules 206, one or more parameters may be configured for each model. Example parameters include a cache expiration parameter for real-time processing, a batch expiration parameter for batch processing, a data change expires cache parameter for real-time processing, a data change expires batch parameter for batch processing, and a cache eager parameter. In the implementation in which the real-time processing model and the batch processing model are the same model, each of the example parameters may be defined for the processing model. The cache expiration parameter indicates a time to store real-time outputs (such as real-time predictions) from the model in a cache. The system 200 may be configured to remove the real-time outputs from the cache when the time is reached. The batch expiration parameter indicates a time that batch outputs (such as batch predictions) from the model are to remain valid. The system 200 may be configured to track the expiration of batch outputs and remove the expired outputs from the data store 218 or another suitable store for the system 200.

The data change expires cache parameter indicates whether any change to the input data to the model is to invalidate cached real-time outputs from the model. If the parameter is set such that changes to the input data is to invalidate cached real-time outputs, the system 200 may be configured to remove the real-time outputs from the cache when the input data changes. A change to input data may refer to a data point being updated (such as, e.g., based on a corrected invoice or other information for QBO) or may refer to a new data point or a threshold number of data points being received. For example, for a model to predict weekly sales, a cached prediction may be determined to be invalidated if a threshold number of new sales are indicated in the incoming time series data from QBO. The system 200 may be configured to remove the previous real-time output (e.g., a previous prediction) from cache. The data change expires batch parameter indicates whether any change to the input data to the model is to invalidate batch outputs from the model. Identifying whether a batch output is invalid may be similar to as described above with reference to the data change expires cache parameter for a real-time parameter. The system 200 may be configured to remove the previous batch output from the data store 218 or otherwise indicate that the batch output is invalid.

The cache eager parameter indicates whether the model is to be rerun for each data change. In some implementations, the cache eager parameter may be the indication as to whether batch processing is to be performed (with the cache eager parameter set to no). In this manner, the model may be ran every, e.g., 10 minutes or another suitable time interval. If the cache eager parameter is set to yes, the model may be ran on request or when new data is received or to be processed. In some implementations, the cache eager parameter set to yes may indicate that real-time processing is performed. As such, the orchestration service may cause the system 200 to switch between batch processing and real-time processing by adjusting the cache eager parameter for the model (and for other processing models that may be run for the time series data). Alternatively, the cache eager parameter may be used to simply indicate whether a model may be run on demand or to indicate that the model is to be run exclusively on demand. In this manner, if outputs in the cache expire, the orchestration service 212 may cause the model to be run again automatically when new data is received or may cause the model to be run again only when a request to run the model is received based on the cache eager parameter.

In some implementations, the orchestration service 212 may manage the parameters for the models of the processing modules 206. In this manner, the orchestration service 212 may manage the outputs of the one or more processing models. In some other implementations, the parameters may be managed at the event bus 214 or another suitable component to remove outputs from cache, the data store 218, or another suitable storage when the outputs expire.

Referring to the orchestration service 212, the orchestration service 212 is configured to manage the system 200 to switch between batch processing and real-time processing. The orchestration service 212 may be an example implementation of the orchestration service 160 of the system 100 depicted in FIG. 1. The orchestration service 212 may be based on an orchestration algorithm defining when to perform batch processing and when to perform real-time processing. When to perform batch processing and when to perform real-time processing may be based on one or more of the input time series data, the model outputs, or model parameters. As such, the orchestration service 212 may receive the input data (such as features from the real-time pre-processor 304 or from the batch pre-processor 302), the model parameters (such as the example parameters described above), or the model outputs for determining whether batch processing or real-time processing is to be performed. Specific data, model outputs, model parameters, or any other information that causes the orchestration service 212 to identify that the system is to switch between batch processing and real-time processing is referred to herein as a switching event. For example, a spike in sales data to cause real-time processing to be performed by a model to generate a weekly sales prediction may be switching event. In a general sense, an orchestration service 212 may identify a switching event and generate an indication of the switching event, with the indication provided for the system to switch between batch processing and real-time processing. In some implementations, the indication may include one or more instructions to cause the system 200 to switch between batch processing and real-time processing (such as to adjust one or more parameters of the models or to otherwise configure the processing modules 206 to switch between batch processing and real-time processing). As noted above, switching modules may include configuring memory or processing resources reserved for one or more processing models (such as increasing resources for a processing model to perform real-time processing or decreasing resources for a processing model to perform batch processing). Switching modules may also include adjusting which features are provided to the one or more models for processing (such as limiting features to a specific entity for real-time processing while providing features for a plurality of entities for batch processing) or selecting which models are to be enabled for processing (such as selecting a smaller subset of models to process features for real-time processing when a specific output is desired while selecting a larger subset of models to process features for batch processing when latency is not as big of a concern). In some implementations, the orchestration service 212 may manage which processing models of the processing module 206 are to be used and which features are to be processed (such as by actively instructing which models are to be executed and which features from the features stores 308 and 310 are to be retrieved and provided to the selected processing models) based on the orchestration algorithm. Auto-scaling of a processing model (thus adjusting the resources for the processing model) may be implemented by the platform (such as in AWS), with the scaling based on the indication from the orchestration service 212.

In an example implementation of the orchestration algorithm, whether real-time processing is to be performed may be based on a validity of previously generated batch outputs. For example, the orchestration algorithm for the orchestration service 212 may include the orchestration service 212: identifying that a model output is to be provided (such as a client service requesting a prediction from a processing model); checking whether a previous real-time output exists in the cache; and if a previous real-time output exists in the cache, checking whether the age of the previous real-time output is less than as defined in the cache expiration parameter. If the previous real-time output is still valid, the real-time output may be provided by the system 200 for the client service without needing to run a model to perform real-time processing. If no previous output is valid, the example orchestration algorithm may further include the orchestration service 212 checking for a previous batch output in the data store or in another suitable storage. If a previous batch output exists in the data store, the orchestration algorithm may further include the orchestration service 212 checking whether the age of the previous batch output is less than as defined in the batch expiration parameter. If the previous batch output is still valid, the system 200 may provide the previous batch output for the client service. The batch output may also be stored in cache to be considered a real-time output for future use. If no previous batch outputs are valid, the example orchestration algorithm may further include the orchestration service 212 indicating that the model is to generate a new output (such as based on real-time processing for a specific entity for a client service). The output may be provided for the client service and stored in a cache for storing real-time outputs.

While one example orchestration algorithm is provided above, with the orchestration algorithm being based on whether an output is requested and a validity of existing prior outputs, any suitable algorithm, including any suitable steps and dependencies, may be used for the orchestration service 212 to identify a switching event or to other manage the switching between batch processing and real-time processing. The algorithm may be adjustable to indicate when batch processing models are to be used, when real-time processing models are to be used, what features are to be provided to the processing models, and so on to manage the processing of the data. For example, with data from QBO, if batch processing is to occur daily, batch processing may occur at night while real-time processing may be desired during the workday. As such, the orchestration algorithm may disable the batch processing module 208 during the day and disable the real-time processing module 210 at night. In the example implementation of the same processing model being used for batch processing and real-time processing, disabling the batch processing module 208 during the day while the real-time processing module 210 may be used includes running the model only with the real-time processing parameters and directing the online features stored and to be real-time processed to the processing model during the workday when real-time processing is to be performed. Disabling the real-time processing module 210 at night (during which the batch processing module 208 may be used) includes running the model only with the batch processing parameters and directing the offline features stored and to be batch processed to the processing model at night when batch processing is to be performed.

In some implementations, the orchestration service 212 is auto-scalable based on the performance of the orchestration service 212. For example, the orchestration service may automatically scale based on an increase in size of the time series data. If data increases for which the orchestration service 212 is to manage, the orchestration service 212 may lag or otherwise degrade in performance. If the performance degradation reaches a threshold, the orchestration service 212 may automatically add additional processing or memory resources to improve the performance of the orchestration service 212.

As noted herein, the outputs of the processing modules 206 may be stored in the data store 218. For example, the batch processing outputs of the one or more batch processing models are provided to the event bus 214, which routes the outputs to the data store 218. In some implementations, the real-time processing outputs of the one or more real-time processing models may also be provided to the event bus 214 and routed to the data store 218. Additionally or alternatively, as noted herein, the real-time processing outputs may be stored in a separate cache for ease of access.

In some implementations, the system 200 includes or is coupled to one or more client services components 220. Various client services may be provided based on the outputs of the processing modules 206. For example, for data 202 from QBO, batch processing outputs may include predictions or inferences across a plurality of entities (such as across an industry), including a specific entity that may be a client. The predictions or inferences are stored in the data store 218 (such as a data lake), and the predictions or inferences may be obtained from the data store by one or more client service components to perform any suitable analytics on such data as desired (such as to see trends in the predictions, accuracies of predictions across the industry, and so on). Any suitable component may be coupled to the data store 218 in order to perform such analytics, with the component providing any results to the client for review. In another example, the client services components 220 may include one or more streaming clients that streams outputs of the processing modules 206 on demand. For example, the event bus 214 may be configured to route the outputs of the modules 206 to a client device so that the client device receives the outputs as they become available. To note, the event bus 214 may execute any suitable rules for routing the outputs to the streaming clients. For example, routing may be time delayed if required or desired.

In another example, the client services components 220 may include one or more third party platforms that uses the outputs to provide value for a client. For example, for data 202 from QBO, the outputs may be routed by the event bus 214 to an API of the Intuit Customer 360 (C360) platform. Alternatively, the event bus 214 may provide the outputs to a system 200 component that generates C360 formatted attributes to be provided to the API of the C360 platform. The C360 platform may use the received outputs or attributes to provide insights to a client or otherwise manage various aspects of the client.

While the above examples of client services are more regarding external clients to the system 200, one or more clients services may be for internal clients. For example, an entity wishing to receive real-time notifications about itself may have a real-time client coupled to the AWS platform implementing the system 200 to receive outputs of the real-time processing module 210. In some implementations, such a real-time client may be coupled to the orchestration service 212 to receive the model outputs about the entity or information regarding such outputs. The orchestration service 212 may format or otherwise package the output and provide such output via an API for the real-time client to receive. To note, such outputs may be provided in any suitable manner, such as when available or in response to a request from the real-time client. The interface with the output may be through the orchestration service 212 instead of directly from the real-time processing module 210 so that any switching between batch processing and real-time processing or other operations occurring within the system 200 remain transparent to the client receiving the real-time notifications or outputs.

In some implementations, the internal client may be a client residing at the provider for performing the data processing. For example, for QBO, an internal client may reside at an Intuit controlled facility. In this manner, the internal client may be a layer between the system 200 performing the data processing and an entity to receive the information provided by the system 200 via the internal client. The internal client may thus package, format, or otherwise handle the outputs received before providing to an entity device. Such handling may be to ensure security of the information (such as reviewing outputs under particular security rules to ensure no sensitive data is transmitted), proper formatting of the information for the entity's device, or to enhance the information (such as generating and providing pictorial representations or additional insights of the information to depict or extrapolate what the outputs convey). While not depicted in FIG. 2, in some implementations, such an internal client may receive an indication from the store and pre-processing module 204 when new data 202 is received for processing. In this manner, the internal client may identify if or when to request an update to the real-time outputs provided to the client based on the new data received at the system 200. The request may be generated and provided to the orchestration service 212, with the orchestration service 212 causing the system 200 to complete the request so that the orchestration service 212 may provide the request real-time output to the internal client. Such a request from the internal client may be considered a switching event for the orchestration service 212. Additional or alternative to the internal client requesting an update, as described herein, the orchestration service 212 may identify when to switch to real-time processing (and to update the output to the internal client) based on other switching events, which may be based on new data triggering such, outputs from the modules 206 expiring, or other circumstances defined in the orchestration algorithm of the orchestration service 212. For example, the orchestration algorithm may define that a switching event occurs based on whether new online data exists combined with whether existing outputs have expired based on the one or more model parameters (such as those model parameters described above).

Figure 4:
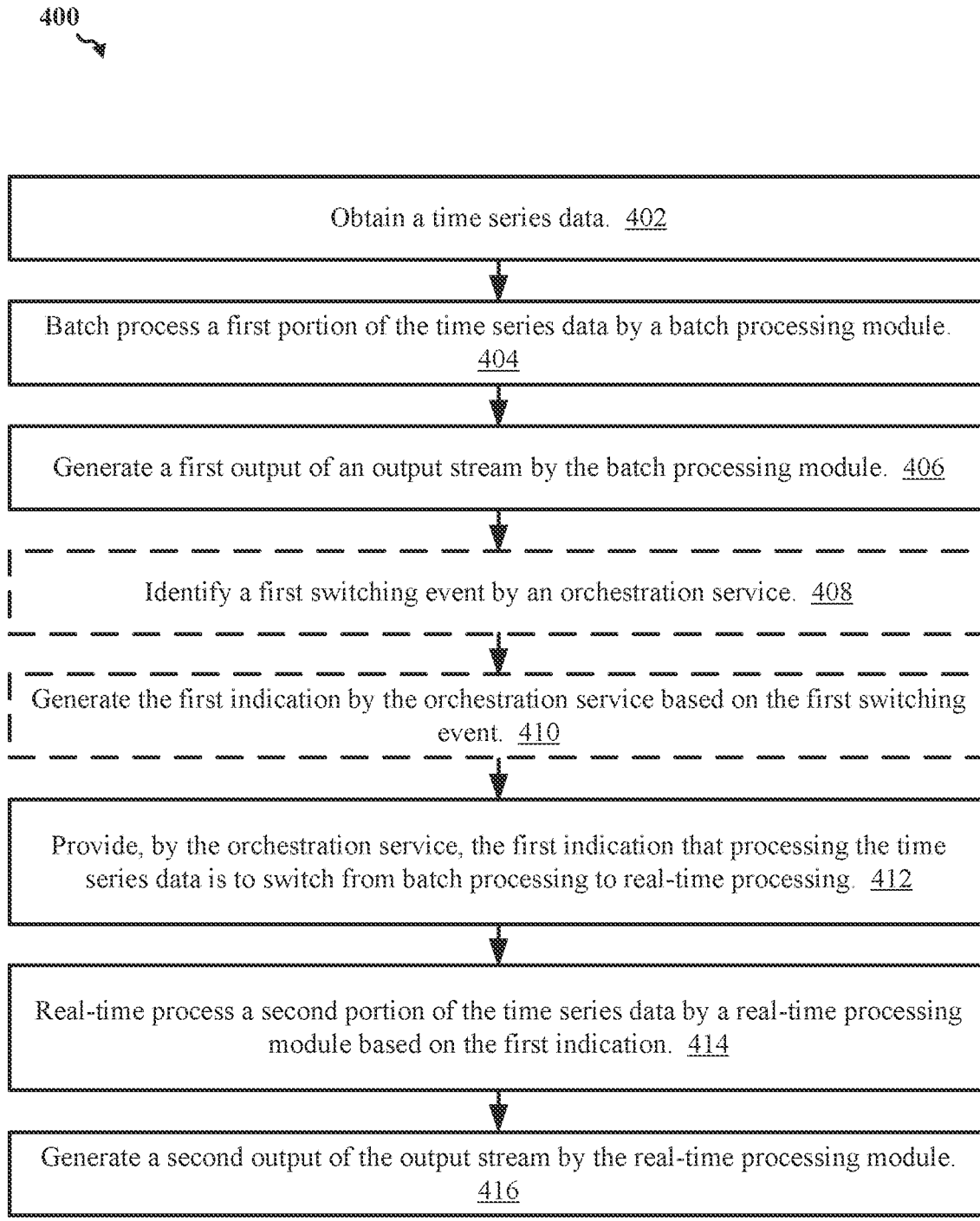
FIG. 4 shows an illustrative flow chart depicting an example operation of processing time series data, according to some implementations.
Figure 5:
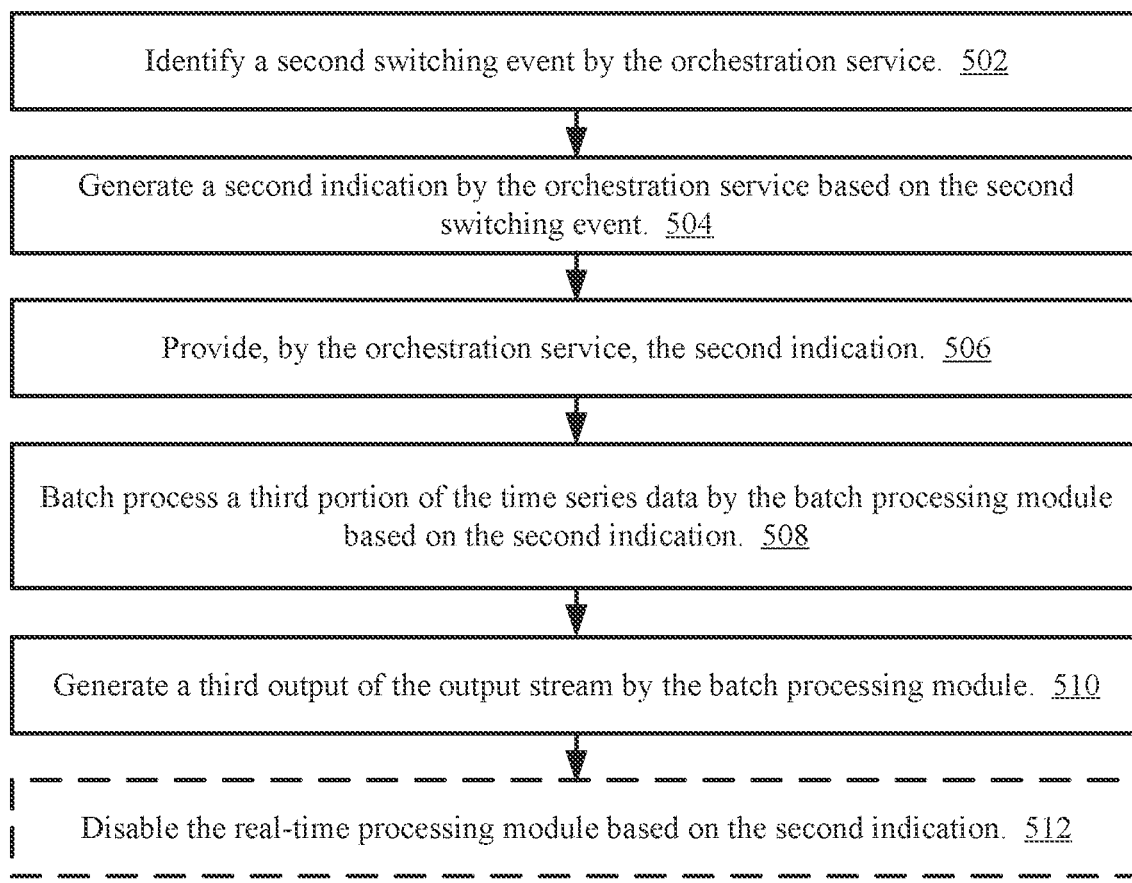
FIG. 5 shows an illustrative flow chart depicting an example operation of further processing time series data, according to some implementations.

As described above, the system 200 is a hybrid model architecture enabled to allow switching between batch processing and real-time processing of data, which may include concurrently performing batch processing and real-time processing or performing one or the other. FIGS. 4 and 5 depict example operations to be performed in switching between batch processing and real-time processing of data, which may be performed by the system 200. Various implementations of the steps depicted in the Figures are as described above in describing FIGS. 2 and 3. FIG. 4 is directed towards switching from batch processing to real-time processing, and FIG. 5 is directed towards switching from real-time processing to batch processing.

FIG. 4 shows an illustrative flow chart depicting an example operation 400 of processing time series data, according to some implementations. The example operation 400 is described as being performed by the system 200 in FIG. 2 (which may include the module 300 depicted in FIG. 3). As noted above, the system 200 may be implemented in system 100, which may be any suitable system (such as being implemented on the AWS platform).

At 402, the system 200 obtains time series data. For example, the system 200 may obtain a stream of time series data 202 from the QBO platform or from another suitable platform. While obtaining time series data is depicted in a single step, obtaining data may be periodic, continuous, or in any manner, as the data may be a stream from the other platform.

At 404, the system 200 batch process a first portion of the time series data by the batch processing module 208. In some implementations, the first portion of the time series data may be the data for a first portion of time for which batch processing is to be performed. For example, the first portion of time series data may be the data from the previous data for daily batches. While not depicted in FIG. 4 (or in FIG. 5), the data may be pre-processed (such as by the batch pre-processor 302) to generate offline features that are to be processed by the batch processing module 208. As noted above, in some implementations, the batch processing module 208 includes one or more batch processing models associated with each model associated with one or more batch processing parameters. Batch processing the first portion of data may include running the one or more batch processing models using the one or more batch processing parameters to process the offline features stored in the offline feature store 308. The first portion of data may thus refer to the offline features of the data.

At 406, the system 200 generates a first output of an output stream by the batch processing module 208. For example, the one or more batch processing models may generate one or more predictions for each batch of offline features in the first portion processed by the batch processing module 208. The outputs may be provided to the event bus 214 to be routed to a data store 218, to various client services components 220, back to the module 204 for storage in the offline store 308 or to cause the outputs to be provided to the orchestration service 212 in determining whether to switch to real-time processing. While not depicted in FIG. 4, in some implementations, during batch processing of the first portion, the real-time processing module 210 may be disabled. For example, if the same model is used for batch processing and real-time processing but using different parameters, the model may be run with the batch processing parameters while not being run with the real-time processing parameters. Alternatively, real-time processing may also be performed concurrently, with an instance of the model being run with the batch processing parameters (to process the offline features) and another instance of the model being run with the real-time processing parameters (to process the online features).

As noted herein, switching between batch processing and real-time processing is managed by the orchestration service 212, which may manage when and which processing is to be performed based on an orchestration algorithm defined in the orchestration service (such as by a developer of the system 200). At 412, the orchestration service 212 provides a first indication that processing the time series data is to switch from batch processing to real-time processing. To provide the indication, the orchestration service may perform steps 408 and 410. At 408, the orchestration service 212 may identify a first switching event. As noted above, a switching event may be any suitable circumstance identified by the orchestration service (such as defined by the orchestration algorithm) for which the system is to switch between batch processing and real-time processing. At 410, the orchestration service 212 may generate the first indication based on the first switching event. In some implementations, the first switching event may be based on the first portion of the time series data. For example, if there is an outlier in the online features as generated by the real-time pre-processor (such as a feature exceeding a defined threshold), the orchestration service 212 may be configured to generate the first indication to switch to real-time processing. Additionally or alternatively, the first switching event may be based on the validity or expiration of outputs from the processing modules 206. For example, if new data is received and the existing outputs from batch processing and real-time processing are expired, the orchestration service 212 may be configured to generate the first indication. In another example, the first switching event may be based on a request to update the outputs to an internal client or to a real-time client for client services.

As noted above, the indication may include instructions to cause the processing module 206 to switch modules and to manage which data (such as which features) are provided to the modules for processing. For example, for the first indication to cause switching from batch processing to real-time processing, the first indication may include instructions to cause a model to stop being run with the batch processing parameters and start being run with the real-time processing parameters. Alternatively, the first indication may include instructions to cause another instance of the model to be run with the real-time processing parameters (with the previous instance of the model continuing to be run for batch processing). The first indication may also include instructions to manage access to the feature stores 308 and 310 such that online features are provided to a processing model running with the real-time processing parameters. If batch processing is not continuing to be performed, the instructions may also cause the offline features in the offline feature store 308 to not be accessed for the model.

At 414, the system 200 real-time processes a second portion of the time series data by a real-time processing module 210 based on the first indication. For example, the system 200 runs one or more processing models with the real-time processing parameters, with online features from the online feature store 310 being retrieved for the models instead of offline features from the offline feature store 308. The second portion of the data may refer to one or more of the online features of the data or the data from a second portion of time (such as a portion of time immediately succeeding the first portion of time). As noted above, real-time processing data may be in addition to batch processing or alternative to batch processing at that instant.

At 416, the system 200 generates a second output of the output stream by the real-time processing module 210. The second output is subsequent to the first output from the batch processing module 208. For example, the model running with the real-time processing parameters may generate one or more real-time predictions after running with the batch processing parameters to generate one or more batch predictions. In a specific example, the orchestration algorithm of the orchestration service may define that real-time processing is to be performed if new data is received for processing and previous real-time processing outputs and previous batch processing outputs are invalid or expired. In this manner, the model, which may be currently configured to perform batch processing using the batch processing parameters, may be run using the real-time processing parameters to process the new data (which may be included in the online features) to generate a new output. The system 200 may also be configured to adjust the resources available for real-time processing (such as increasing memory or processing resources). As noted above, the real-time processing output may in some instances also be stored as a batch processing output (especially if the operations to be performed for batch processing are the same as the operations to be performed for real-time processing for, e.g., a specific entity). In this manner, the second output may be stored in a cache for real-time processing outputs as well as a data store (such as a data lake) for batch processing outputs. As noted above, the stored outputs may be used for analytics or other client services.

The fidelity of the second portion of time series data processed by the real-time processing module 210 may be the same as the fidelity of the first portion of time series data processed by the batch processing module 208. For example, the offline features may include the same information as online features, except potentially in a different format. The accuracy of the real-time processing module 210 may also be the same as the accuracy of the batch processing module 208. For example, as noted above, the same model trained on the same data set may be used to perform batch processing and real-time processing, with different parameters defined for batch processing and real-time processing to differentiate the model between the two. In some implementations, the batch processing module 208 includes one or more batch processing models, and the real-time processing module 210 includes one or more real-time processing models. As noted above, the one or more real-time processing models and the one or more batch processing models may be the same models operating under different parameters based on whether batch processing or real-time processing is to be performed.

FIG. 5 shows an illustrative flow chart depicting an example operation 500 of further processing time series data, according to some implementations. Operation 500 is regarding switching from real-time processing to batch processing. In some implementations, the example operation 500 is in addition and subsequent to the example operation 400 in FIG. 4. The example operation 500 is described as being performed by the system 200 in FIG. 2 (which may include the module 300 depicted in FIG. 3).

At 502, the orchestration service 212 identifies a second switching event. The second switching event may be based on the obtained time series data in block 402, outputs of the processing modules 206, completion of a request from a client for an update to the real-time processing outputs provided to the client, or other suitable circumstances. At 504, the orchestration service 212 generates a second indication based on the second switching event. At 506, the orchestration service 212 provides the second indication. The second indication may include instructions to cause a switch from real-time processing to batch processing. For example, after real-time processing is completed to update a real-time processing output and a batch processing output when the previous outputs are expired or invalid, the orchestration service 212 may identify that real-time processing is no longer needed, thus generating the second indication. If a same processing model is used for batch processing and real-time processing, the second indication may include instructions for the processing model running with the real-time processing parameters (and configured to receive online features from the online feature store 310 for real-time processing) for real-time processing to instead be run with the batch processing parameters for batch processing. The instructions may also manage the retrieval of offline features from the offline feature store 308 for batch processing by the processing model (with the online features from the online feature store not being retrieved). The system 200 may also be configured to adjust the memory or processing resources to be used for processing (such as reducing the memory and processing resources reserved for the processing model for batch processing as compared to when the processing model performs real-time processing).

At 508, the batch processing module 208 batch processes a third portion of the time series data based on the second indication. The third portion of the data may be one or more of another set of offline features additional to the offline features previously batch processed or data from a third time period subsequent to the first time period (and possibly subsequent to the second time period). For example, a processing model to perform batch processing may process a new batch of offline features not previously processed when the processing model last performed batch processing (such as previously generating weekly sales forecast for last week and to generate a new weekly sales forecast for next week based on new offline features from the week for the received data). At 510, the batch processing module 208 generates a third output of the output stream, with the third output being subsequent to the first output and the second output. As noted above, the output of the batch processing module 208 may be routed to a data store 218 or used for one or more client services. For example, for data from QBO for an entity (and potentially for other entities), the system 200 may generate one or more attributes of the entity based on the output stream (with the entity being associated with the time series data 202 received by the system 200). The system 200 (or another suitable system or component) may then provide one or more client services regarding the entity based on the one or more attributes (such as notifications or alerts regarding new predictions, analytics regarding the batch processing outputs stored in a data lake, C360 attributes being used to provide insights to the entity, and so on).

In some implementations, for switching from real-time processing to batch processing, the system 200 may disable the real-time processing module 210 based on the second indication (512). For example, a processing model may be run with the batch processing parameters instead of the real-time processing parameters. Additionally or alternatively, one or more of the processing models may not be used for batch processing. In another example, memory or processing resources enabled for real-time processing or freed for other tasks. Alternative to disabling the real-time processing module 210, the system 200 may have the batch processing module 208 and the real-time processing module 210 operating concurrently. For example, as noted above, a first instance of a processing model may be run with the batch processing parameters, and a second instance of the processing model may also be run with the real-time processing parameters.

As described herein, an architecture to support a hybrid model of data processing between batch processing and real-time processing is implemented, with the operations of such hybrid model being described. The system implementing such a hybrid model has the advantage of providing real-time processing outputs (such as real-time predictions) when necessary or desired without sacrificing accuracy to reduce the latency in generating such outputs. In addition, the system allows such as hybrid model to be scalable for any size to data to be processed, any number of models to be used for processing, and any number of conditions to be considered for determining when to perform batch processing and when to perform real-time processing. Such flexibility also allows real-time processing (and optionally batch processing) to be disabled or enabled when not needed, which may conserve processing resources or otherwise make the model more efficient. To note, while many of the example are regarding data from QBO for processing for clarity in explaining aspects of the disclosure, the hybrid model may be implemented for any suitable data to be processed in which both batch processing and real-time processing may be desired.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for processing time series data, the computer-implemented method comprising:
    obtaining a time series data;
    batch processing a first portion of the time series data by a batch processing module;
    generating a first output of an output stream by the batch processing module;
    identifying a first switching event by the orchestration service, wherein the first switching event is based on the first portion of the time series data;
    generating a first indication by the orchestration service based on the first switching event, wherein the first indication indicates that processing the time series data is to switch from batch processing to real-time processing;
    providing, by the orchestration service, the first indication;
    real-time processing a second portion of the time series data by a real-time processing module based on the first indication; and
    generating a second output of the output stream by the real-time processing module, wherein the second output is subsequent to the first output.

2. The computer-implemented method of claim 1, wherein generating the first indication includes:
    receiving a request for a prediction of a future state of an entity associated with the time series data, wherein outputs of the batch processing module and the real-time processing module include predictions of the future state of the entity;
    checking whether a real-time processing output is stored and is valid in response to the received request;
    checking whether a batch processing output is stored and is valid in response to either the real-time processing output not being stored or not being valid; and
    generating the first indication in response to either the batch processing output not being stored or not being valid, wherein the prediction is generated by the real-time processing module based on the first indication.

3. The computer-implemented method of claim 1, further comprising:
    identifying a second switching event by the orchestration service;
    generating a second indication by the orchestration service based on the second switching event, wherein the second indication indicates that processing the time series data is to switch from real-time processing to batch processing;
    providing, by the orchestration service, the second indication;
    batch processing a third portion of the time series data by the batch processing module based on the second indication; and
    generating a third output of the output stream by the batch processing module, wherein the third output is subsequent to the second output.

4. The computer-implemented method of claim 3, further comprising disabling the real-time processing module based on the second indication.

5. The computer-implemented method of claim 1, wherein a fidelity of the second portion of the time series data processed by the real-time processing module is the same as a fidelity of the first portion of the time series data processed by the batch processing module.

6. The computer-implemented method of claim 5, wherein:
   the batch processing module includes one or more batch processing models; and
   the real-time processing module includes one or more real-time processing models, wherein the one or more real-time processing models and the one or more batch processing models are the same models operating under different parameters based on whether batch processing or real-time processing is to be performed.

7. The computer-implemented method of claim 1, further comprising automatically scaling the orchestration service based on an increase in size of the time series data.

8. The computer-implemented method of claim 1, further comprising:
   generating one or more attributes of an entity based on the output stream, wherein the entity is associated with the time series data; and
   providing one or more client services regarding the entity based on the one or more attributes.

9. A computing system for processing time series data, the computing system comprising:
   one or more processors; and
   a memory storing instructions that, when executed by the one or more processors, causes the computing system to perform operations comprising:
      obtaining a time series data;
      batch processing a first portion of the time series data by a batch processing module;
      generating a first output of an output stream by the batch processing module;
      identifying a first switching event by the orchestration service, wherein the first switching event is based on the first portion of the time series data;
      generating a first indication by the orchestration service based on the first switching event, wherein the first indication indicates that processing the time series data is to switch from batch processing to real-time processing;
      providing, by the orchestration service, the first indication;
      real-time processing a second portion of the time series data by a real-time processing module based on the first indication; and
      generating a second output of the output stream by the real-time processing module, wherein the second output is subsequent to the first output.

10. The computing system of claim 9, wherein generating the first indication includes:
   receiving a request for a prediction of a future state of an entity associated with the time series data, wherein outputs of the batch processing module and the real-time processing module include predictions of the future state of the entity;
   checking whether a real-time processing output is stored and is valid in response to the received request;
   checking whether a batch processing output is stored and is valid in response to either the real-time processing output not being stored or not being valid; and
   generating the first indication in response to either the batch processing output not being stored or not being valid, wherein the prediction is generated by the real-time processing module based on the first indication.

11. The computing system of claim 9, wherein the operations further comprise:
   identifying a second switching event by the orchestration service;
   generating a second indication by the orchestration service based on the second switching event, wherein the second indication indicates that processing the time series data is to switch from real-time processing to batch processing;
   providing, by the orchestration service, the second indication;
   batch processing a third portion of the time series data by the batch processing module based on the second indication; and
   generating a third output of the output stream by the batch processing module, wherein the third output is subsequent to the second output.

12. The computing system of claim 11, wherein the operations further comprise disabling the real-time processing module based on the second indication.

13. The computing system of claim 9, wherein a fidelity of the second portion of the time series data processed by the real-time processing module is the same as a fidelity of the first portion of the time series data processed by the batch processing module.

14. The computing system of claim 13, wherein:
   the batch processing module includes one or more batch processing models; and
   the real-time processing module includes one or more real-time processing models, wherein the one or more real-time processing models and the one or more batch processing models are the same models operating under different parameters based on whether batch processing or real-time processing is to be performed.

15. The computing system of claim 9, wherein the orchestration service is automatically scalable based on an increase in size of the time series data.

16. The computing system of claim 9, wherein the operations further comprise:
   generating one or more attributes of an entity based on the output stream, wherein the entity is associated with the time series data; and
   providing one or more client services regarding the entity based on the one or more attributes.

\* \* \* \* \*